(12) United States Patent
Rao et al.

(10) Patent No.: US 11,100,224 B2
(45) Date of Patent: Aug. 24, 2021

(54) INTERFERENCE DETECTION DEVICE AND DETECTION SENSITIVITY ADJUSTING METHOD THEREOF

(71) Applicant: ALi Corporation, Hsinchu (TW)

(72) Inventors: Wei-Ke Rao, Guangdong (CN); Rui Yang, Guangdong (CN); Hai-Hua Wen, Guangdong (CN)

(73) Assignee: ALI CORPORATION, Hsinchu (TW)

( * ) Notice: Subject to any disclaimer, the term of this patent is extended or adjusted under 35 U.S.C. 154(b) by 162 days.

(21) Appl. No.: 16/689,001

(22) Filed: Nov. 19, 2019

(65) Prior Publication Data

US 2020/0257798 A1 Aug. 13, 2020

(30) Foreign Application Priority Data

Feb. 13, 2019 (CN) .......................... 201910112492.6

(51) Int. Cl.
| | | |
|---|---|---|
| *G01R 23/20* | (2006.01) | |
| *G06F 21/55* | (2013.01) | |
| *H03K 5/13* | (2014.01) | |
| *G01R 31/00* | (2006.01) | |
| *H03K 3/037* | (2006.01) | |
| *H03K 19/21* | (2006.01) | |

(52) U.S. Cl.
CPC ......... *G06F 21/556* (2013.01); *G01R 31/002* (2013.01); *H03K 3/037* (2013.01); *H03K 5/13* (2013.01); *G06F 2221/034* (2013.01); *H03K 19/21* (2013.01)

(58) Field of Classification Search
CPC .. G06F 21/556; G06F 2221/034; G06F 21/75; G06F 21/76; H03K 5/13; H03K 3/037; H03K 19/21; H03K 3/0375; G01R 31/002; G01R 31/31708
USPC ........................................................ 324/620
See application file for complete search history.

(56) References Cited

U.S. PATENT DOCUMENTS

| | | | | |
|---|---|---|---|---|
| 4,591,834 A * | 5/1986 | Kyle | ...................... | G08B 13/00 340/518 |
| 5,159,282 A * | 10/1992 | Serizawa | .............. | H04L 1/0001 329/316 |
| 6,763,074 B1 * | 7/2004 | Yang | ......................... | H04L 1/22 375/232 |
| 7,321,632 B2 * | 1/2008 | Perets | ............... | H04L 25/03006 375/262 |
| 2008/0315927 A1 * | 12/2008 | Cho | ....................... | H03L 7/0814 327/158 |
| 2019/0220055 A1 * | 7/2019 | Gal | ....................... | H03L 7/0816 |

FOREIGN PATENT DOCUMENTS

CN 107944309 4/2018

* cited by examiner

*Primary Examiner* — Ryan Jager
(74) *Attorney, Agent, or Firm* — J.C. Patents

(57) ABSTRACT

An interference detection device and a detection sensitivity adjusting method are provided. A signal generating circuit generates a detection signal. A delay circuit delays the detection signal to generate a plurality of delay signals with different delay time. A decision circuit selects one of the delay signals according to a first section signal for comparing with the detection signal to generate an interference detection result, where the delay signals are used for adjusting the detection sensitivity of the interference detection device.

10 Claims, 3 Drawing Sheets

INTERFERENCE DETECTION DEVICE AND DETECTION SENSITIVITY ADJUSTING METHOD THEREOF

CROSS-REFERENCE TO RELATED APPLICATION

This application claims the priority benefit of China application serial no. 201910112492.6, filed on Feb. 13, 2019. The entirety of the above-mentioned patent application is hereby incorporated by reference herein and made a part of this specification.

BACKGROUND

Technical Field

The invention relates to a detection device, and particularly relates to an interference detection device and a detection sensitivity adjusting method thereof.

Description of Related Art

In order to obtain confidential information in a chip, a hacker may physically perturb the chip (for example, by physically contacting or destroying a signal line, by applying a high power laser or an electromagnetic pulse, or by generating a glitch on a power supply or other external interface) to make a circuit to operate incorrectly, which causes the circuit to output data related to the confidential information or assists the hacker to infiltrate the circuit or its stored data. In order to effectively protect the confidential information in the chip, a detection circuit may be set on the chip to detect whether the chip is attacked, so as to start a corresponding security measures in time when the chip starts to be attacked without leaking sensitive data, thereby effectively preventing leakage of confidential information. Therefore, a magnitude of detection sensitivity of the detection circuit for the attack is critical to the success of attack resistance. However, due to a simulation error in chip design or a manufacturing process variation, the sensitivity of the detection circuit probably cannot meet the expectations of the circuit design, which makes the chip unable to resist the attack effectively.

SUMMARY

The invention is directed to an interference detection device and a detection sensitivity adjusting method thereof, which are adapted to optimize an interference detection sensitivity of the interference detection device, by which not only leakage of confidential information due to interference attacks is effectively avoided, but also probability of misoperation of the detection device is reduced due to adjustability of the detection sensitivity.

The invention provides an interference detection device including a signal generating circuit, a delay circuit and a decision circuit. The single generating circuit generates a detection signal. The delay circuit is coupled to the signal generating circuit, and delays the detection signal to generate a plurality of delay signals with different delay time. The decision circuit is coupled to the signal generating circuit and the delay circuit, and the decision circuit selects one of the delay signals according to a first section signal for comparing with the detection signal to generate an interference detection result, where the delay signals are used for adjusting the detection sensitivity of the interference detection device.

The invention provides a detection sensitivity adjusting method of an interference detection device, which includes: generating a first detection signal to a delay circuit according to a first clock signal, so as to generate a first delay signal; comparing the first detection signal with the first delay signal to generate a first interference detection result; determining whether abnormity is occurred according to the first interference detection result; when determining that abnormity is not occurred according to the first interference detection result, generating a second detection signal to the delay circuit according to a second clock signal with a frequency greater than that of the first clock signal, so as to generate a second delay signal; comparing the second detection signal with the second delay signal to generate a second interference detection result; determining whether abnormity is occurred according to the second interference detection result; taking a current delay time of the delay circuit as a finally determined delay time when determining that abnormity is occurred according to the second interference detection result; and increasing the delay time of the delay circuit to generate the first interference detection result again when determining that abnormity is not occurred according to the second interference detection result.

Based on the above description, the delay circuit of the embodiments of the invention is adapted to delay the detection signal to generate a plurality of delay signals with different delay times, and the decision circuit is adapted to select one of the delay signals to compare with the detection signal to generate the interference detection result, where the detection sensitivity of the interference detection device is adjusted by selecting different delay signals. The interference detection sensitivity of the interference detection device may be optimized by selecting the proper delay signal, so as to start a security protection measures in time when an interference attack occurs, and effectively avoid leakage of confidential information due to the interference attack and reduce the probability of misoperation of the interference detection device.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
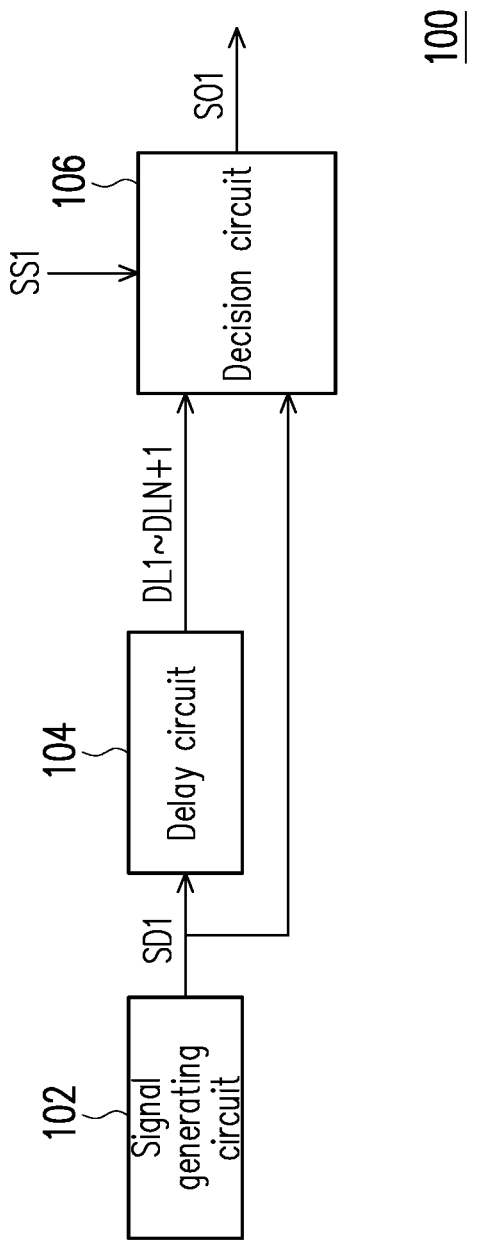
FIG. 1 is a schematic diagram of an interference detection device according to an embodiment of the invention.

FIG. 1 is a schematic diagram of an interference detection device 100 according to an embodiment of the invention. The interference detection device 100 includes a signal generating circuit 102, a delay circuit 104 and a decision circuit 106. The single generating circuit 102 generates a detection signal SD1 for providing to the delay circuit 104, and the delay circuit 104 is coupled to the signal generating circuit 102 and delays the detection signal SD1 to generate a plurality of delay signals DL1-DLN+1, where N is a positive integer, and the delay signals DL1-DLN+1 respectively correspond to different delay time. The decision circuit 106 is coupled to the signal generating circuit 102 and the delay circuit 104, and selects one of the delay signals DL1-DLN+1 according to a section signal SS1 and compares the selected delay signal with the detection signal SD1 to generate an interference detection result SO1 to a post-stage security protection circuit (not shown), where the interference detection result SO1 may be used for determining whether an electronic device applying the interference detection device 100 is attacked, and the post-stage security protection circuit may start a security protection measures according to the interference detection result SO1, for example, to reboot a system, turn off a power supply or change a data processing method, etc., so as to avoid leakage of confidential information in the electronic device applying the interference detection device 100.

Further, when the electronic device applying the interference detection device 100 is attacked, a time that the delay circuit 104 delays the detection signal SD1 is changed, i.e. the delay time corresponding to the delay signals DL1-DLN+1 is changed. In this way, a signal value obtained by the decision circuit 106 by sampling the selected delay signal is probably changed, which is different to a signal value obtained through sampling under a normal working condition. In other words, when the delay signal is changed, the interference detection result SO1 is different, so that according to the interference detection result SO1, it can be learned whether the electronic device applying the interference detection device 100 is attacked.

Therefore, the delay time of the delay signal selected by the decision circuit 106 is related to a detection sensitivity of the interference detection device 100, and in the case that the selected delay signal makes the interference detection device 100 not to output the abnormal interference detection result SO1, the smaller a tolerable variation margin of the delay time is, the higher the detection sensitivity of the interference detection device 100 is.

In an embodiment, the selection method of the delay signal may be determined by the interference detection result SO1 obtained by changing the frequency of the detection signal SD1. To be specific, whether the selected delay signal has a proper delay time is determined according to the interference detection result SO1 corresponding to the detection signal SD1 with a normal frequency and the interference detection result SO1 corresponding to the detection signal SD1 with an increased frequency. For example, if the selected delay signal has the proper delay time, the interference detection result SO1 corresponding to the detection signal SD1 with the normal frequency will not be abnormal, and the interference detection result SO1 corresponding to the detection signal SD1 with the increased frequency will be abnormal. For another example, if the selected delay signal makes the interference detection result SO1 to be not abnormal before and after the frequency of the detection signal SD1 is increased, but if the delay signal with a longer delay time is selected, the interference detection result SO1 is abnormal before the frequency of the detection signal SD1 is increased, the selected delay signal may serve as a finally selected delay signal, so as to optimize the detection sensitivity of the interference detection device. By selecting the delay signal with the proper delay time, the detection sensitivity of the interference detection device 100 is optimized, so as to effectively avoid leakage of the confidential information due to the interference attack and reduce the probability of misoperation of the interference detection device.

Figure 2:
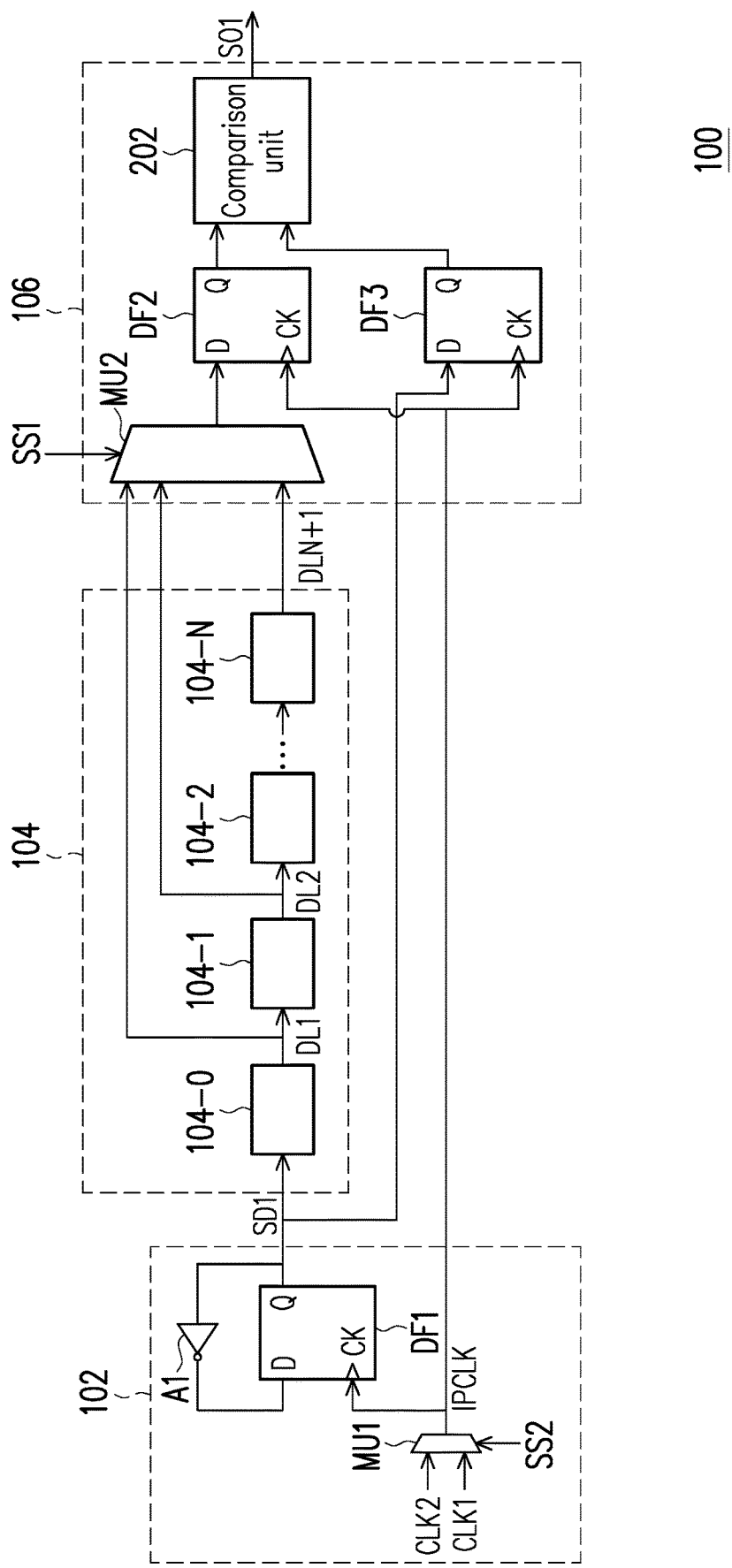
FIG. 2 is a circuit structural schematic diagram of an interference detection device according to an embodiment of the invention.

FIG. 2 is a circuit structural schematic diagram of the interference detection device 100 according to an embodiment of the invention. In the FIG. 2, the signal generating circuit 102 includes a flip-flop DF1, an inverter A1 and a multiplexer MU1, and the delay circuit 104 includes a plurality of delay units 104-0~104-N connected in series with each other. The decision circuit 106 includes a multiplexer MU2, flip-flops DF2 and DF3 and a comparison unit 202.

In an embodiment, an output terminal Q of the flip-flop DF1 in the signal generating circuit 102 is coupled to an input terminal of the delay unit 104-0, an input terminal D of the flip-flop DF3 of the decision circuit 106, and an input terminal of the inverter A1. An output terminal of the inverter A1 is coupled to an input terminal D of the flip-flop DF1. Input terminals of the multiplexer MU1 receive a first clock signal CLK1 and a second clock signal CLK2, where a frequency of the second clock signal CLK2 is greater than a frequency of the first clock signal CLK1, and an output terminal of the multiplexer MU1 is coupled to clock input terminals CK of the flip-flops DF1, DF2 and DF3.

In an embodiment, the delay circuit 104 includes a plurality of delay units 104-0~104-N connected in series with each other, and the delay units 104-0~104-N may be implemented by a plurality of inverters connected in series, though the invention is not limited thereto. The delay units 104-0~104-N are coupled between the output terminal Q of the flip-flop DF1 and input terminals of the multiplexer MU2, where output terminals of each of the delay units 104-0~104-N are respectively coupled to the input terminals of the multiplexer MU2 to output the delay signals DL1-DLN+1 to the multiplexer MU2. In an embodiment, a delay time of the delay unit 104-0 may be greater than delay time of the other delay units 104-1~104-N, i.e. the delay time of the delay signal DL1 is greater than the delay time of each of the other delay signals DL2-DLN+1, though the invention is not limited thereto. The delay unit 104-0 may be used for roughly adjusting the delay time, and the delay units 104-1~104-N may be used for finely adjusting the delay time. The multiplexer MU2 of the decision circuit 106 receives a plurality of the delay signals DL1-DLN+1, and an output terminal of the multiplexer MU2 is coupled to an input terminal D of the flip-flop DF2, and output terminals Q of the flip-flops DF2 and DF3 are coupled to the comparison unit 202.

A working principle of the interference detection device 100 is described below. The multiplexer MU1 selects one of the first clock signal CLK1 and the second clock signal CLK2 to serve as an operation clock IPCLK according to a selection signal SS2, and outputs the operation clock IPCLK to the clock input terminals CK of the flip-flops DF1, DF2 and DF3 to control the flip-flops DF1, DF2 and DF3 to respectively latch and output a signal received by the input terminal D thereof, for example, the flip-flop DF1 may latch the signal of the input terminal D thereof and output the detection signal SD1 to the delay unit 104-0 and the input terminal D of the flip-flop DF3. A frequency of the operation clock IPCLK is determined by the clock signal selected by the multiplexer MU1, and frequencies of the signals latched and output by the flip-flops DF1, DF2 and DF3 are accordingly changed along with a change of the frequency of the operation clock IPCLK. For example, when the frequency of the operation clock IPCLK is increased, the frequency of the detection signal SD1 is also increased. The multiplexer MU2 selects one of the delay signals DL1-DLN+1 according to the selection signal SS1 for outputting to the input terminal D of the flip-flop DF2, the flip-flop DF2 may latch and output the delay signal selected by the multiplexer MU2 to the comparison unit 202 according to the operation clock IPCLK, and the flip-flop DF3 may latch and output the detection signal SD1 to the comparison unit 202 according to the operation clock IPCLK. Moreover, the comparison unit 202 may compare the delay signal provided by the flip-flop DF2 and the detection signal SD1 provided by the flip-flop DF3 to output the interference detection result SO1.

In an embodiment, the comparison unit 202 may be an XOR gate, though the invention is not limited thereto. Since the XOR gate outputs a logic value "0" when the signals of the input terminals are the same, and outputs a logic value "1" when the signals of the input terminals are different, by using the XOR gate, the logic value of the interference detection result SO1 may be used to determine whether there is the interference attack to cause the flip-flop DF2 outputting a different logic value with the flip-flop DF3, such that the post-stage security protection circuit may start the security protection measures according to the interference detection result SO1, so as to avoid leakage of the confidential information in the electronic device applying the interference detection device 100.

As described above, the multiplexer MU2 selects one of the delay signals DL1-DLN+1 for outputting to the flip-flop DF2, in collaboration with the multiplexer MU1 switching the frequency of the operation clock IPCLK to change the frequency of the detection signal SD1, and the comparison unit 202 comparing whether the delay signals respectively output by the flip-flops DF2 and DF3 are the same with the detection signal, and accordingly it is able to find the delay signal with the smallest variation margin of the delay time that the interference detection device 100 may tolerate, so as to optimize the sensitivity of the interference detection device 100. Since the selection method of the delay signal has been described in the embodiment of FIG. 1, those skilled in the art should be able to deduce the implementation of using the interference detection device 100 to select the delay signal according to the description of the embodiment of FIG. 1, and detail thereof is not repeated.

Figure 3:
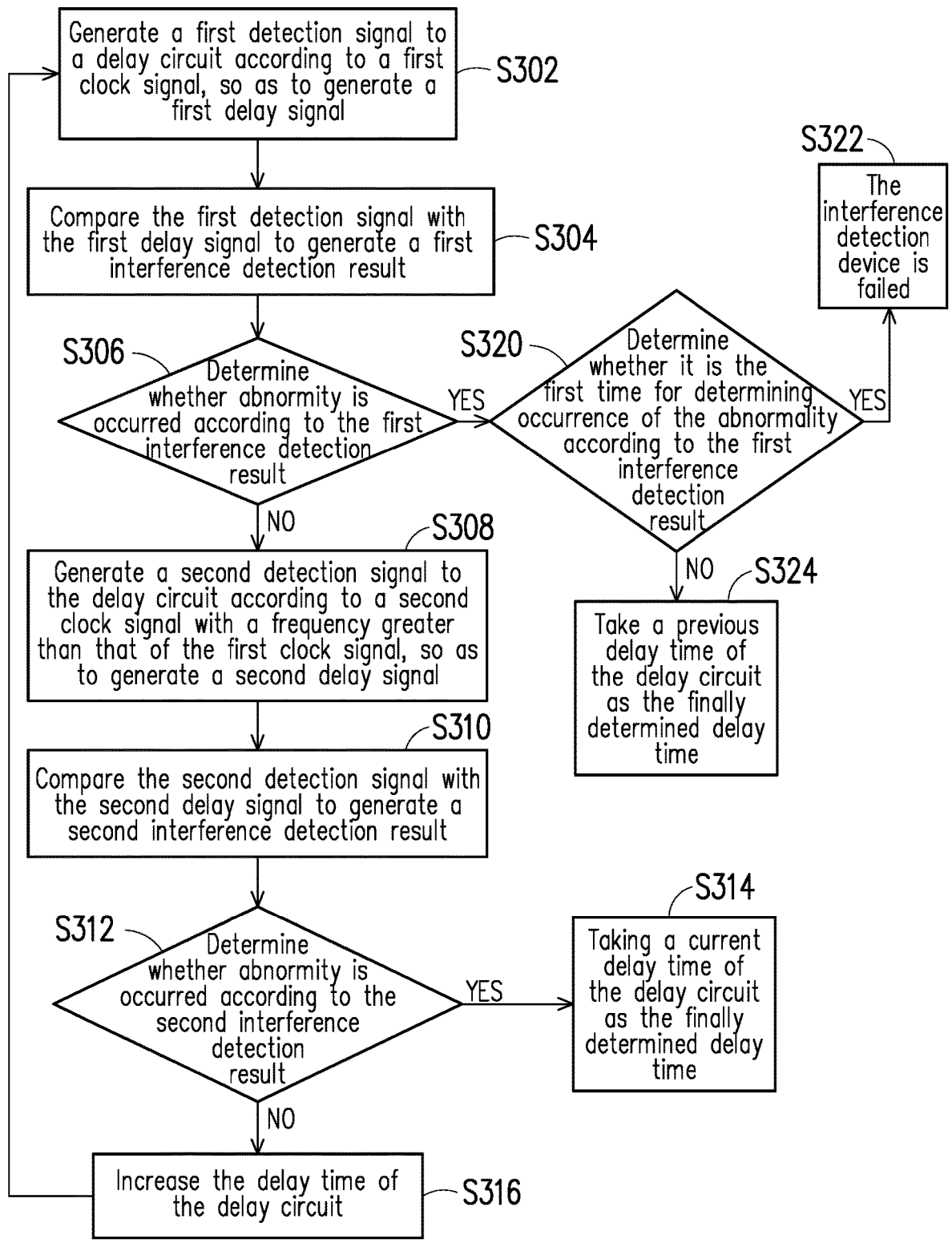
FIG. 3 is a flowchart illustrating a detection sensitivity adjusting method of an interference detection device according to an embodiment of the invention.

FIG. 3 is a flowchart illustrating a detection sensitivity adjusting method of an interference detection device according to an embodiment of the invention. The detection sensitivity adjusting method of the interference detection device may include at least the following steps. First, a first detection signal is generated to a delay circuit according to a first clock signal, so as to generate a first delay signal (step S302). Then, the first detection signal is compared with the first delay signal to generate a first interference detection result (step S304), for example, an XOR logic operation is performed to the first detection signal and the first delay signal to generate the first interference detection result. Then, it is determined whether abnormity is occurred according to the first interference detection result (step S306), in case that the first detection signal and the first delay signal have different values, it is determined that abnormity is occurred according to the first interference detection result. If it is determined that abnormity is occurred, it is then determined whether it is the first time for determining occurrence of the abnormality according to the first interference detection result (step S320). If it is the first time for determining occurrence of abnormality according to the first interference detection result, it represents that the interference detection device itself is probably failed rather than the delay time of the first delay time being too long, and it is directly determined as failure of the interference detection device (step S322). When it is the first time for determining occurrence of abnormality according to the first interference detection result, the delay signal with a shorter delay time may be first selected as the first delay signal, so as to avoid misjudging failure of the interference detection device. If it is not the first time for determining occurrence of abnormality according to the first interference detection result in the step S320, a previous delay time of the delay circuit is taken as a finally determined delay time (step S324).

If it is determined that abnormity is not occurred in the step S306, a second detection signal is generated to the delay circuit according to a second clock signal with a frequency greater than that of the first clock signal, so as to generate a second delay signal (step S308). Then, the second detection signal is compared with the second delay signal to generate a second interference detection result (step S310). Thereafter, it is determined whether abnormity is occurred according to the second interference detection result (step S312), and in case that the second detection signal and the second delay signal have different values, it is determined that abnormity is occurred according to the second interference detection result. If it is determined that abnormity is occurred, a current delay time of the delay circuit is taken as the finally determined delay time (step S314), and if it is determined that abnormity is not occurred, the delay time of the delay circuit is increased (step S316), and then the flow returns back to the step S302 to make the delay circuit to generate the first delay signal with the increased delay time according to the first clock signal, and then execute the subsequent steps until the proper delay time is determined.

In summary, the delay circuit of the embodiment of the invention is adapted to delay the detection signal to generate a plurality of delay signals with different delay times, and the decision circuit is adapted to select one of the delay signals to compare with the detection signal to generate the interference detection result, where the detection sensitivity of the interference detection device is adjusted by selecting different delay signals. In this way, even if the sensitivity of the interference detection device does not meet the expectations of the circuit design due to a simulation error in chip design or a manufacturing process variation, the proper delay signal may still be selected to optimize the interference detection sensitivity of the interference detection device, so as to opportunely start the security protection measures when the interference attack occurs, and effectively avoid leakage of confidential information due to the interference attack and reduce the probability of misoperation of the detection device.

What is claimed is:

1. An interference detection device with adjustable detection sensitivity, comprising:
   a signal generating circuit, generating a detection signal;
   a delay circuit, coupled to the signal generating circuit, and delaying the detection signal to generate a plurality of delay signals with different delay times; and
   a decision circuit, coupled to the signal generating circuit and the delay circuit, and selecting one of the delay signals according to a first section signal to compare with the detection signal to generate an interference detection result, wherein the delay signals are used for adjusting the detection sensitivity of the interference detection device.

2. The interference detection device with adjustable detection sensitivity as claimed in claim 1, wherein the signal generating circuit generates a first detection signal according to a first clock signal or generates a second detection signal according to a second clock signal, wherein a frequency of the second clock signal is greater than a frequency of the first clock signal, so that a frequency of the second detection signal is greater than a frequency of the first detection signal.

3. The interference detection device with adjustable detection sensitivity as claimed in claim 2, wherein the signal generating circuit comprises:
 a first flip-flop, coupled to the delay circuit and the decision circuit;
 an inverter, having an input terminal and an output terminal respectively coupled to an output terminal and an input terminal of the first flip-flop; and
 a first multiplexer, receiving the first clock signal and the second clock signal, and selecting one of the first clock signal and the second clock signal to serve as an operation clock according to a second selection signal and outputting the operation clock to the first flip-flop.

4. The interference detection device with adjustable detection sensitivity as claimed in claim 3, wherein the decision circuit comprises:
 a second multiplexer, receiving the delay signals, and selecting one of the delay signals according to the first selection signal;
 a second flip-flop, coupled to an output terminal of the second multiplexer;
 a third flip-flop, coupled to the signal generating circuit to receive the detection signal; and
 a comparison unit, coupled to output terminals of the second flip-flop and the third flip-flop, and comparing outputs of the second flip-flop and the third flip-flop to generate the interference detection result,
 wherein the third flip-flop and the second flip-flop operate based on the operation clock.

5. The interference detection device with adjustable detection sensitivity as claimed in claim 1, wherein the delay circuit comprises:
 a first delay unit, coupled to the signal generating circuit, and outputting a first delay signal to the decision circuit according to the detection signal; and
 N second delay units connected in series with each other, wherein N is a positive integer, a first one of the second delay units is coupled to the first delay unit and outputs a second delay signal to the decision circuit, and a last one of the second delay units outputs an $(N+1)^{th}$ delay signal to the decision circuit,
 wherein a delay time of the first delay unit is greater than a delay time of each of the second delay units.

6. A detection sensitivity adjusting method of an interference detection device, comprising:
 generating a first detection signal to a delay circuit according to a first clock signal, so as to generate a first delay signal;
 comparing the first detection signal with the first delay signal to generate a first interference detection result;
 determining whether abnormity is occurred according to the first interference detection result;
 when determining that abnormity is not occurred according to the first interference detection result, generating a second detection signal to the delay circuit according to a second clock signal with a frequency greater than that of the first clock signal, so as to generate a second delay signal;
 comparing the second detection signal with the second delay signal to generate a second interference detection result;
 determining whether abnormity is occurred according to the second interference detection result;
 taking a current delay time of the delay circuit as a finally determined delay time when determining that abnormity is occurred according to the second interference detection result; and
 increasing the delay time of the delay circuit to generate the first interference detection result again when determining that abnormity is not occurred according to the second interference detection result.

7. The detection sensitivity adjusting method of the interference detection device as claimed in claim 6, further comprising:
 determining that the interference detection device is failed when it is a first time for determining that abnormity is occurred according to the first interference detection result.

8. The detection sensitivity adjusting method of the interference detection device as claimed in claim 6, further comprising:
 taking a previous delay time of the delay circuit as the finally determined delay time when it is not a first time for determining that abnormity is occurred according to the first interference detection result.

9. The detection sensitivity adjusting method of the interference detection device as claimed in claim 6, wherein the comparison is an XOR logic operation.

10. The detection sensitivity adjusting method of the interference detection device as claimed in claim 6, wherein determining that abnormity is occurred according to the first interference detection result represents that the first detection signal and the first delay signal have different values, and determining that abnormity is occurred according to the second interference detection result represents that the second detection signal and the second delay signal have different values.

* * * * *